United States Patent [19]
Richter et al.

[11] 3,737,696
[45] June 5, 1973

[54] HIGH SPEED HOMOPOLAR INDUCTOR GENERATOR WITH STRAIGHT WINDING CONSTRUCTION

[75] Inventors: Eike Richter, Erie; George E. Brissey, Harbrocreek, both of Pa.

[73] Assignee: General Electric Company, Wilmington, Del.

[22] Filed: Sept. 16, 1971

[21] Appl. No.: 181,001

[52] U.S. Cl. .................................. 310/168, 310/262
[51] Int. Cl. ............................................ H02k 19/20
[58] Field of Search ..................... 310/168, 169, 156, 310/262, 261, 265, 269

[56] References Cited
UNITED STATES PATENTS

| | | | |
|---|---|---|---|
| 1,773,074 | 8/1930 | Borreson | 310/168 |
| 2,525,456 | 10/1950 | Merrill | 310/156 X |
| 3,157,806 | 11/1964 | Wiedemann | 310/262 X |
| 3,205,384 | 9/1965 | Sears | 310/168 |
| 3,243,621 | 3/1966 | Wesolowski | 310/168 |
| 3,284,651 | 11/1966 | Wesolowski | 310/168 |
| 3,321,652 | 5/1967 | Opel | 310/168 |
| 3,467,845 | 9/1969 | Wesolowski | 310/168 |

*Primary Examiner*—D. F. Duggan
*Attorney*—I. David Blumenfeld, Frank L. Neuhauser, Oscar B. Waddell

[57] ABSTRACT

A high speed homopolar generator is described capable of operating efficiently at rotational speeds of 90,000 rpm and above. The generator includes a smooth cylindrical rotor with axially in-line magnetic north and south poles at opposite ends of the rotor. The AC windings in the individual stator stacks are offset by 180 electrical degrees as they pass between stacks to insure that the induced voltage in the active portions of each winding are of the proper polarity. The cylindrical rotor construction minimizes windage losses and includes a straight bar of magnetic material with the circumferential interpolar space filled with a non-magnetic material. The non-magnetic material is bonded to the magnetic bar so that the resulting magnetic-non-magnetic composite rotor is strong enough to withstand the mechanical stresses to which it is subjected at speeds in excess of 90,000 rpm. Layers of the non-magnetic material are deposited on the bar of magnetic material by a plasma-arc hot wire welding process and the assembly is then machined into the desired cylindrical shape to minimize windage. In this fashion, the geometry of the rotor is optimized, the maximum amount of axial magnetic section is obtained with the simplest rotor geometry, the requisite physical strength is obtained, while at the same time, reducing or minimizing windage at the very high velocities obtained in the machine.

6 Claims, 5 Drawing Figures

PATENTED JUN 5 1973 3,737,696
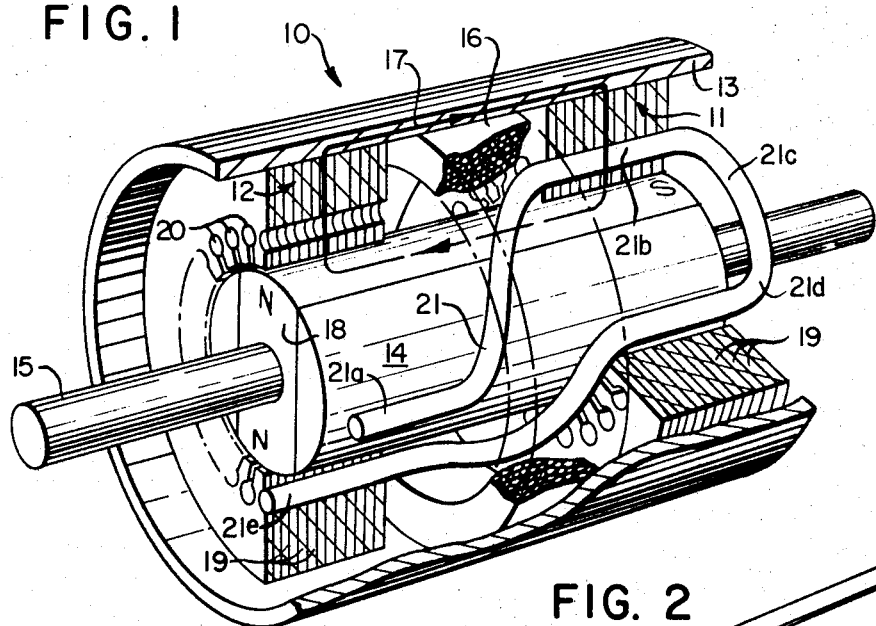
FIG. 1
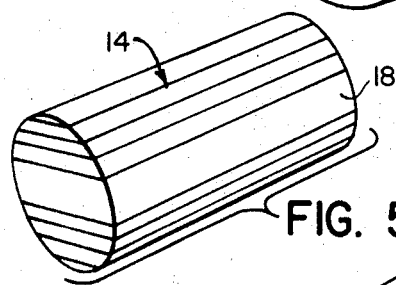
FIG. 5
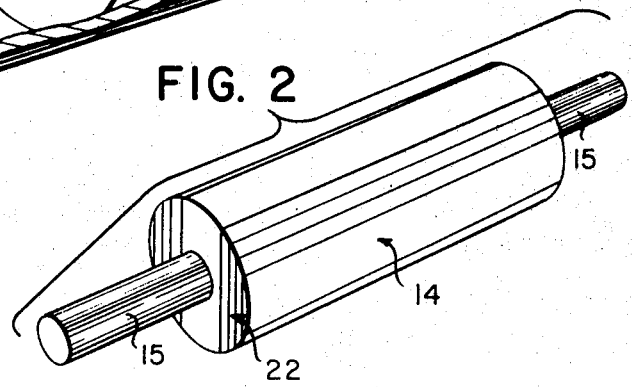
FIG. 2
FIG. 3
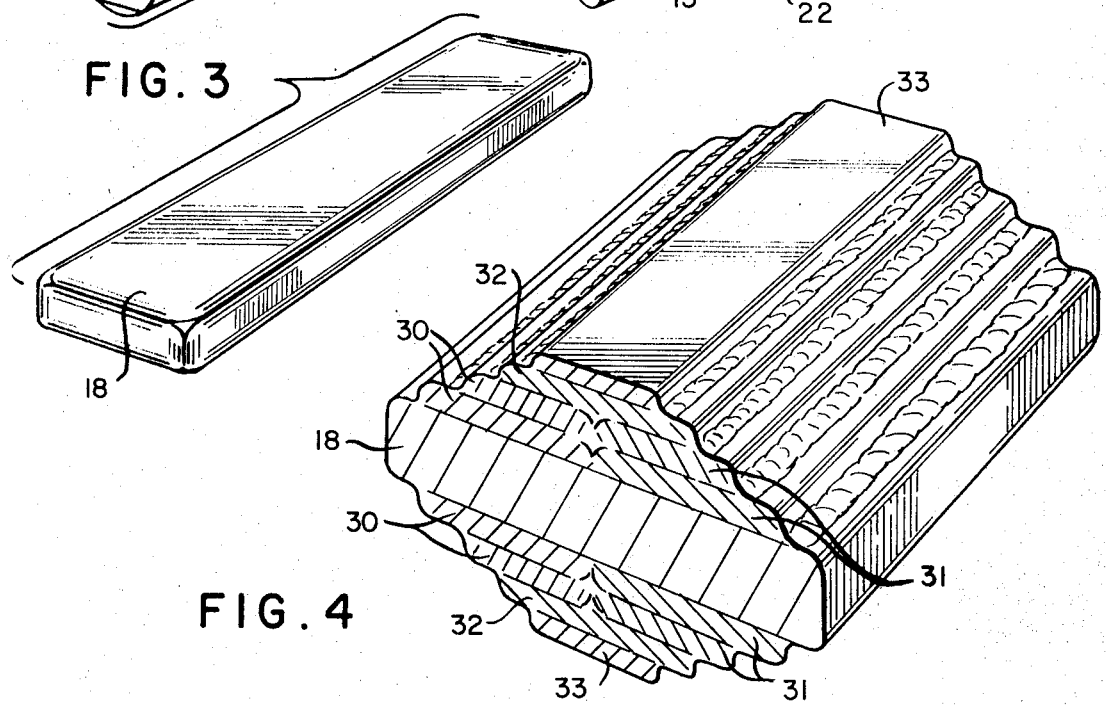
FIG. 4

HIGH SPEED HOMOPOLAR INDUCTOR GENERATOR WITH STRAIGHT WINDING CONSTRUCTION

This invention relates to a dynamoelectric machine, and more particularly, to a high speed generator having axially in-line rotor poles.

Electrical power generation systems which are to be utilized in environments where space and weight are at a premium, as for example, in airborne or mobile power applications, require small, light weight generators in which the generator weight per KVA output is minimized. These desirable characteristics, namely high output, light weight on a per KVA basis, as well as small size, are not easily realized since they involve conflicting requirements from the standpoint of the design of the machine.

The power level of any rotating machine is determined by two quantities, torque and speed. The torque in any electrical machine is a function of the magnetic flux and the number of ampere turns (current multiplied by the number of turns). The magnetic flux determines the cross-section of the magnetic circuit, the core, poles and teeth, while the ampere turns product determines the space required for the windings. It is abundantly clear that for any given output, increasing torque inevitably means increasing the size and amount of the iron in the circuit as well as the number of and the space required by the windings. Hence, increasing torque is not a very attractive alternative where size and weight of the machine are important considerations. Consequently, if the generator is to be small in size and light in weight, the torque has to be kept down and the speed will have to be high. Increasing the speed of the machine, however, in turn generates a different, but equally difficult, set of problems. These problems are not only the basic technical problems such as the mechanical stress capability of the rotor at high speed, the electrical and magnetic characteristics of a device at these speeds, but also the fundamental problem relating to the application of the device. This threshold problem deals with the manner in which the output from the generator is utilized and the frequency requirements of the power system being supplied by the generator. In a ground power 60 Hz system, for example, if the output of the generator is used directly to supply the 60 Hz power, then there is an immediate limitation on the speed at which the generator can be driven, since the maximum speed for a 60 Hz synchronous generator is 3,600 rpm. Thus, the driving speed for the generator, has, in the past, often been limited by the system frequency requirements in the particular application.

Recent developments in high efficiency solid state cycloconverter circuitry however, now make it possible to convert electrical power at almost any frequency to lower frequency such as 60 Hz. The generator may, therefore, be run at much higher speeds without being limited by the output frequency since a cycloconverter is used to convert the generator output to the required system frequency. Consequently, the speed range for generators useful in aircraft, ground power, (where the generator is driven directly from a high speed gas turbine, for example) or other applications, can be increased substantially. In the case of a mobile ground-power application, for example, the generator can be driven in excess of 3,600 rpm even when utilized in electrical systems requiring 60 Hz or less. Consequently, high speed generators now have applications in areas hitherto foreclosed to them because of frequency limitations. In applications where the system frequency requirements pose no limitation on the speed of the generator, or where the use of cycloconverters or other electronic circuitry with the generator allow conversion to lower frequencies, the use of small, light weight machines driven at high speeds and capable of substantial output power levels now becomes possible.

The design of such small, high speed machines, of course, requires solution of technical problems peculiarly associated with a dynamoelectric machines driven at high speed. Thus, the mechanical stress on the rotor present one set of constraints on the design; the magnetic characteristics of the rotor and its corresponding effect on the size of the rotor and the stress level within the rotor constitute another set of design constraints, while the efficiency of the machine in terms of rotor size and windage losses presents yet another problem uniquely associated with the high speed machine. Conventional wound rotor generators have been found to be of a limited utility for high speed operation. Wound rotor generators are, as a practical matter, limited to speeds of about 25 to 26,000 rpm since at higher speeds, the mechanical stresses on the rotor windings become excessive. At speeds in excess of 26,000 rpm, a solid rotor machine is a virtual necessity since only a solid rotor can withstand the mechanical stresses at the higher speeds. Typical of such solid state rotor machines, is the homopolar inductor alternator. In such machines, the rotors carry no windings and consist basically only of magnetic steel. The excitation field for establishing the magnetic rotor poles is transferred to the stator with the stator consisting of two separate stator stacks with the multi-phase AC stator winding being wound straight through corresponding slots in the two stator stacks.

In machines of this type, the voltage induced in the stator AC winding is due to the variation of the air-gap length or, magnetically speaking, the air-gap permeance as the rotor poles rotate relative to the stator windings. The permeance variations cause a flux variation from a very high value at the point of large permeance to a very low value at the point of low permeance. Since the DC excitation from the field coil winding produces north and south poles along the axis of the rotor so that the poles are at opposite ends of the rotor, it is customary in these prior art machines to offset the rotor poles by 180 electrical degrees in order to induce voltage of the proper polarity in the individual windings wound in the separate stators. Otherwise, the north and south rotor poles pass by a coil side, one-half of which is in one stator and the other half in the other stator at the same time so that the induced voltages in the coil side halves are of opposite polarity and cancel. Thus, for a four pole stator design, for example, the offset of a 180 electrical degrees, requires a 90° mechanical offset of the two rotor halves. The rotor geometry consequently, is quite complex and this complexity gives rise to many difficulties.

With the rotor poles mechanically offset by some amount to achieve the necessary 180 electrical degree offset, the center portion of the rotor located between the offset or twisted rotor pole sections has to carry the entire flux from one rotor half to the other. Thus, the most critical part of the rotor as far as magnetic characteristics are concerned, is this center portion since it limits the amount of flux which can be carried axially. Since the center portion is inevitably smaller than the rotor poles, the overall rotor dimensions are basically controlled by the diameter of the center portion as determined by the flux carrying capacity of this center portion. As a rule, this tends to increase the overall diameter of the rotor increasing not only the size, but more importantly, at very high speeds, the windage losses which are a fourth power function of the diameter size.

In addition, the mechanical displacement or twisting of the rotor in order to achieve the needed 180° electrical displacement of the poles, results in a rotor geometry which can cause severe problems at high speeds due to windage losses. These windage losses could be reduced to some extent by evacuating the stator cavity to a pressure level when the losses are insignificant. Alternatively, the interpolar spaces or slots could be filled with non-magnetic material creating a solid cylindrical rotor having reduced windage losses. The evacuation of the stator cavity to a low pressure level is impractical for large scale production generators because the problems of sealing the stator to maintain the low level pressure as well as the complexity of the pumping mechanism which would be involved. The other alternative of closing the slots with a non-magnetic material to create a solid cylindrical rotor is extremely difficult to achieve without impairing the mechanical rotor strength. In the first place, with the rotor poles displaced mechanically, by 90°, in the case of a four-pole machine, it is an exceedingly difficult fabrication process to deposit non-magnetic material in the interpolar slots while yet maintaining the mechanical integrity of these non-magnetic materials at high speeds in the range of 90,000 rpm or above. Thus, the rotor geometry of the prior art machines caused severe, if not insurmountable problems in fabricating a generator which had the desired weight, size and efficiency characteristics, while being driven at very high speeds in the order of 90,000 rpm and above.

A need therefore, exists for a small, light-weight, highly efficient solid rotor generator capable of being driven at extremely high speeds, in the order of 90,000 rpm and above, in which the rotor geometry is simplified to reduce costs, the problem of depositing a non-magnetic material on the surface of the magnetic material to produce a cylindrical, smooth surfaced rotor which reduces windage substantially and increases the efficiency of the machine is greatly simplified. To this end, a new machine has been developed having a new simplified rotor geometry in which the flux carrying cross-section is maximized for a given diameter of rotor. This permits overall reduction of the rotor diameter for any given power level which, in itself, is a substantial advantage in reducing windage losses since windage losses are a fourth power function of the rotor diameter. In addition, by providing a simplified geometry for the rotor pole, the problem of depositing the non-magnetic materials on the magnetic rotor bar to produce a high strength composite cylindrical rotor is greatly reduced. Furthermore, the application of new techniques for depositing the non-magnetic material in layers, and thereby enhancing the structural and mechanical integrity of the rotor under the stresses produced by the high speed rotation, are made possible.

It is a primary objective of the instant invention therefore, to provide homopolar inductor alternator with an improved solid rotor construction which is capable of operating at extremely high speeds.

Another objective of the invention is to provide a homopolar inductor alternator with a highly simplified, linear rotor pole geometry which has improved efficiency at high speeds.

Still another object of the invention is to provide a homopolar inductor alternator with offset stator windings and a solid rotor of simple geometry having axially in-line poles.

Yet another objective of the invention is to provide a homopolar inductor alternator having a solid rotor with a geometry such that windage losses at the high speeds are minimized, while the structural integrity of the high speeds is maintained.

Yet a further objective of the invention is to provide a solid rotor homopolar inductor alternator having a composite cylindrical rotor construction of magnetic material and a plurality of layers of non-magnetic material of high mechanical strength.

Yet a further objective of the invention is to provide a new and improved method for fabricating a composite magnetic-non-magnetic solid state rotor of a cylindrical configuration in which the non-magnetic material is deposited in a plurality of layers.

Other objectives and advantages of the instant invention will become apparent as the description proceeds.

In carrying out the various objectives of this invention, a homopolar inductor alternator is provided which includes a solid rotor having axially in-line magnetic poles. The stator windings, on the other hand, are offset 180° electrically in order to produce induced voltages of the proper polarity in the AC windings. The rotor is of a cylindrical configuration to minimize windage losses at the high speeds desired, namely 90,000 rpm and above. The cylindrical rotor has a composite structure made up of a bar of magnetic material and a plurality of layers of non-magnetic material deposited on the magnetic bar by means of a plasma-arc hot wire weld process. This results in excellent bonding between the magnetic material and the non-magnetic layers as well as between the non-magnetic layers themselves so that the mechanical strength of the composite rotor is very high and capable of withstanding the mechanical stresses produced at high speeds.

The novel features which are believed to be characteristic of this invention are set forth with particularity in the appended claims.

The invention, itself, both as to its organization and method of operation, together with further objectives and advantages thereof, may be best understood by reference to the following description taken in connection with the accompanying drawings in which:

FIG. 1 is a partial perspective of a homopolar generator constructed in accordance with the invention.

FIG. 2 is a perspective view of a composite rotor with the straight through geometry for providing axial in-line poles.

FIGS. 3–5 are perspective views of the various stages of fabrication rotor components and are useful in understanding the manner in which the rotor is manufactured.

The straight rotor offset stator winding homopolar inductor alternator of the instant invention may be seen most clearly in FIG. 1 in which the rotor, stator stacks, stator AC windings, and field excitation windings are shown in highly simplified form to aid in the basic understanding of the invention, while yet clarifying the description thereof by eliminating unnecessary or repetitive structural details.

The homopolar alternator inductor shown generally at 10 in FIG. 1 includes a pair of laminated stator stacks 11 and 12 supported in a cylindrical housing 13. A rotor 14 mounted on shaft 15 is supported for rotation in the stator bore by means of bearings, not shown, securing in housing end bells, also not shown. Housing 13 which is made of a magnetic material, also supports an annular field excitation coil 16 positioned between stator stacks 11 and 12. Field excitation coil 16 is energized in a conventional manner from a source of unidirectional power, not shown, and produces a unidirectional flux which passes through the housing, the stator stacks, and then axially along the rotor, as shown schematically by the solid and dashed lines 17 which represent the flux path. As can be seen, the flux passes in a clockwise direction through housing 13 and through a central magnetic member 18 forming part of cylindrical rotor 14. The flux produced by the field excitation coil 16 produces the rotor north and south poles shown respectively at the left and right hand ends of the rotor.

The stator laminations 19 which are fastened together in any suitable fashion to form the stator stack, have suitable coil slot openings along the inner bore to form the slots 20 which extend axially along the stator stacks. The AC stator windings 21, only one of which is illustrated in FIG. 1, are distributed in winding slots 20 of the two stator stacks in a manner presently to be described.

The AC windings are mechanically offset in passing from one stator stack to the other to provide the necessary 180° electrical transposition to induce voltages of the proper polarity in the active portions of the windings. Since the north and south poles are in-line axially at opposite ends of magnetic member 18 forming part of the rotor, the north and south poles pass by corresponding stator slots in the stacks at the same time. If each coil side of the stator windings were distributed between the stacks in such fashion that the coil side passes straight through from one stator stack to the other, it is obvious that the north and south poles would induce voltages of equal magnitude and the opposite polarity in each coil side thereby reducing the output to zero. Hence, the stator windings must be offset by 180° electrical in passing from one stator stack to the other so that voltages of the proper polarity are induced in the conductor portions lying in the two stator stacks.

In the embodiment of FIG. 1, the number of slots and distribution of the windings are for a four-pole machine so that each coil of the stator windings must be offset mechanically by 90° in order to achieve the necessary 180° electrical offset. A single stator coil is shown at 21 of FIG. 1 to illustrate the manner in which each portion of the coil sides must be offset in passing from one stator stack to the other. As shown in FIG. 1, each coil is distributed between the stator stacks so that one-half of each coil side, top and bottom, is wound in one of the stator stacks. Thus, top coil side portion 21a and bottom coil side portion 21e are wound in stator stack 12 while top and bottom coil side portions 21b and 21d respectively are wound in stator stack 11. In the illustrated example, top coil side 21a passes through a coil slot, not shown, in stator stack 12 and is positioned 90° mechanically from the rotor north pole for the instantaneous rotor position shown in FIG. 1. The air-gap between top coil side portion 21a and the rotor north pole is therefore, at a maximum, or, in magnetic terms, the permeance is at a minimum so that the induced voltage in coil portion 21a is also at a minimum. In order to induce any voltage in the top coil side for the rotor position illustrated in FIG. 1, the remaining top coil side portion 21b should be so positioned with respect to a rotor pole that the permeance is at a maximum. Consequently, the top coil side is offset by a sufficient amount in passing from stator stack 12 to stator stack 11 so that top coil side portion 21b passes through stator stack 11 at a point where it is directly above the rotor south pole so that the air-gap is a minimum and the permeance at a maximum thereby inducing maximum voltage of one polarity in topside coil portion 21b.

The bottom side of the coil must now have a voltage induced therein which is opposite in polarity to that induced in top coil side portion 21 so that the induced voltages in both coil sides add. Consequently, the bottom coil side portion in stator stack 11 must be offset sufficiently to minimize voltage induced by the rotor south pole since this voltage would be of the same polarity as the voltage induced in top coil side portion 21b and the voltages could cancel. Hence, the end-turn 21c of coil 21 is offset by 90° mechanically so that bottom coil side portion 21d which is wound back through stator stack 11 has virtually no voltage induced since it is displaced 90° mechanically from the south pole and the magnetic permeance is very low. The remaining bottom coil side portion 21e is offset so that bottom coil side portion 21e passes through stator stack 12 at a position where the air-gap relative to the rotor north pole is at a minimum, and the permeance at a maximum. This induces a voltage in that portion of the bottom side of the coil which is in stator stack 12 of a polarity opposite to that induced in that portion of the top coil side which is wound through stator stack 11. Thus, with a rotor construction having axially in-line rotor poles, one portion of one side of the stator AC winding in one stator stack must be positioned so that passage of one of the rotor poles by this winding portion induces a maximum voltage of one polarity whereas the opposite pole induces a voltage in the other side of the coil which is passing through the other stator stack. Thus, voltages of substantially the same magnitude but of opposite polarity, are produced in the opposite sides of the coil to produce the desired output voltage. The remaining portions of the individual coil sides passing through the same stator stack must be offset in such a manner that no voltages are induced in these other coil portions.

Cylindrical rotor 14, as pointed out previously, includes a bar of magnetic material 18 which provides an axial path for the magnetic flux produced by field coil 16 to produce axially in-line north and south poles in the rotor. A plurality of non-magnetic layers 22 are bonded to the opposite surfaces of bar 18 and to each other to form the rotor cylinder. This composite structure of magnetic and non-magnetic materials has the high structural strength capable of withstanding the mechanical stresses at their interfaces at the high speeds at which the rotor is driven. The magnetic material may be of any suitable type which has the proper magnetic characteristics as well as the mechanical properties to withstand the mechanical stresses imposed on it at the high driving speed. Thus, for example, the magnetic material may be an ASA 4340 steel which is chromium-molybdenum steel, the composition of which is set forth below:

Chemical Composition — %

| | |
|---|---|
| Carbon | .38 – 0.43 |
| Manganese | 0.60 – 0.80 |
| Phosphorus, Max. | 0.040 |
| Sulfur, Max. | 0.040 |
| Silicon | 0.20 – 0.35 |
| Nickel | 1.65 – 2.00 |
| Chromium | 0.70 – 0.90 |
| Molybdenum | 0.20 – 0.30 |
| Iron | Balance |

The non-magnetic material can be of any suitable type which is non-magnetic, is easily deposited, has mechanical characteristics similar to that of the steel in terms of withstanding the mechanical stresses. The non-magnetic material also should have a temperature coefficient generally in the same range as that of the magnetic material and its density should be the same as or very close to that of the magnetic material. One non-magnetic material which has been found to be suitable and meets all these characteristics when used with a 4340 steel, is a nickel-chromium-iron alloy welding wire known under the trade-designation as Inconel Fillermetal 92, the composition of which is tabulated below:

Chemical Composition — %

| | |
|---|---|
| Nickel plus Cobalt, Min. | 67.0 |
| Chromium | 14.0 – 17.0 |
| Iron, Max. | 10.0 |
| Titanium | 2.5–3.5 |
| Manganese | 2.0–2.75 |
| Cobalt, Max. | 1.0 |
| Copper, Max. | 0.50 |
| Sulfur, Max. | 0.015 |
| Silicon, Max. | 0.35 |
| Carbon, Max. | 0.10 |

The composite cylindrical rotor construction illustrated in FIGS. 1 and 2, consisting of a straight center portion of magnetic material and a plurality of deposited layers of non-magnetic material, extending radially outward, may be fabricated in any number of ways. However, the preferred process for fabricating the cylindrical composite rotor is a process involving the deposition of the layers of non-magnetic material, such as Inconel 92 on both surfaces of the magnetic material such as 4340 steel, by means of a plasma-arc hot wire welding process since it produces a structure with very excellent bonding between the magnetic and the non-magnetic materials as well as between the layers of non-magnetic materials. It has been found that a composite rotor fabricated in this manner has, as will be described in detail later, very high tensile strength, and that the tensile strength of the non-magnetic layers approaches that of the magnetic material itself; lying in the range of 70 to 80 percent of the tensile strength of the magnetic bar.

The preferred method of fabricating the composite cylindrical rotor for the homopolar generator of the instant invention may be best understood by reference to FIGS. 2, 3 and 4 which illustrate various steps in the process. Thus, in FIG. 3, a bar 18 of magnetic material of suitable length and rectangular configuration is provided. The bar may be constituted of any suitable magnetic material but, as pointed out previously, an ASA 4340 steel is one such material which has been found to be useful and useable in the process. As shown in FIG. 4, a plurality of layers 30 through 33 of a non-magnetic material such as the nickel-chromium-iron alloy Inconel 92 are then deposited on the opposite surfaces of magnetic bar 18 to produce a series of layers of the decreasing width. These layers are deposited by a plasma-arc hot wire welding process. This process consists of two independently controlled systems operating together in one weld puddle to melt and fuse the surfacing alloy Inconel 92 to the 4340 substrate. Two wires of the Inconel 92 Fillermetal are fed at a constant speed through a pair of individual hot wire nozzles to intersect in a weld puddle beneath a plasma-arc. The Inconel 92 Fillermetal wires are connected electrically in series and energized from an AC constant potential power supply. Resistance heating takes place in each electrode between the wire contact tip and the weld puddle. Positioned directly above the weld puddle and adjacent to the Inconel Filler wires is a plasma-arc torch which is connected to a constant DC power supply. The plasma-arc functions to melt the top surface layer of the substrate and to completely fuse the fillermetal to it with a minimum dilution. A helium-argon gas mixture is passed around a tungsten electrode of the plasma-arc torch to shield the weld puddle directly under the torch. An inert gas shield is formed over the molten puddle to provide gas protection over the point of deposit and bonding. The fillermetal and resistive heating element assembly as well as the plasma-gas torch are moved at a predetermined rate along the length of the bar to deposit the layers of Inconel 92. Preferably, as shown in FIG. 4, two layers 31 are deposited side by saide on the surface of the magnetic material 18 and the remaining layers thereover until the desired heighth is achieved. This, however, is not crucial since this depends on the width of the magnetic material and the width of the layer that may be laid down by the plasma-arc hot wire welding process. The layers of non-magnetic material are applied alternately to opposite sides of the bar of magnetic material in order to simplify the process and also minimize distortion and bowing of bar 18 due to the heating effects of the plasma-arc hot wire welding process. After a suitable number of layers on the non-magnetic material have been deposited on the bar of magnetic material, the bar is then machined to produce the cylindrical composite rotor construction shown at FIG. 5. The cylindrical bar is then cut axially to the desired length and the shafts are attached to the rotor by any suitable means such as inertial welding or the like.

Arc plasma hot wire welding is a cladding process for fusing or bonding a surfacing alloy to a substrate. For further details of such a process, reference is hereby made to an article entitled "Plasma-Arc Hot Wire Surfacing", by E.C. Garrabrant and R.S. Zuchowski in 1969, Welding Journal.

It will be obvious that variations in the fabrication process just described can be made. However, while other means for depositing the non-magnetic material are known, it has been found that the plasma-arc hot wire welding process is both useful as well as very efficient in producing very tightly bonded layers of the non-magnetic material which have the proper tensile strength to withstand the mechanical stresses on the rotor at speeds of 90,000 rpm or above.

The AC windings in stator stacks 11 and 12 are, as illustrated in FIG. 1, offset by 180 electrical degrees as the coils go from one core to the next. In the four-pole configuration illustrated in FIG. 1, a 180 electrical degree offset of the windings is achieved by a mechanical offset of 90° between one stator stack and the next. The mechanical offset required in going from one core to the other may be achieved in any one of a number of ways well known to those skilled in the winding art. The AC conductors may either be inserted individually into each of the slots and the conductors bent as they move from one core to the other and back.

Preferably, however, the conductors are wound straight through from one stack to the next in linear fashion and then the stacks are turned with respect to each other by a predetermined amount to achieve the desired offset. This is the preferred mode since it allows for accurate control of the mechanical offset, minimizes the amount of labor involved in producing the offset and furthermore, is economical of manufacturing time since it permits machine winding of the two stacks at one time with the offset being achieved by a later operation, i.e. by mounting the two cores in a fixture and mechanically rotating one with respect to the other by a fixed amount.

It will also be understood that more than a single conductor per slot may be provided with the customary transportation of coil sides from the top to the bottom of the slots as the coils are wound from slot to slot.

A homopolar generator embodying the various features of the instant invention was constructed and tested to determine its mechanical strength through destructive testing of certain rotor components and to determine whether the stress levels at failure exceeded those to be expected under the maximum operating speeds. Furthermore, the machine was run through a number of tests to determine what windage losses would be when operated at 93,500 rpm.

To test mechanical strength, a number of rotors were constructed in the manner described above and samples were cut from the composite rotor and the tensile strength in pounds per square inch (p.s.i.) were measured by testing the samples until they were fractured and determining therefrom the tensile psi at fracture. Three samples of a composite rotor of 4340 steel covered by a plurality of layers of Inconel 92 non-magnetic material were tested to destruction. In addition, a sample of the solid 4340 steel was also tested to destruction to determine tensile strength of the composite relative to that of the magnetic material. The following tabulation indicates the tensile strength of the materials in that the fracture value for each of the samples is tabulated.

TABLE I

| Specimen | Tensile psi (Fracture Value) |
|---|---|
| 1. 4340 Steel/ Inconel 92 | 118,000 |
| 2. " | 114,000 |
| 3. " | 116,000 |
| 4. 4340 Steel | 152,000 |

As can be seen from this tabulation, the composite rotors have tensile strengths, in terms of psi at fracture, ranging from 114 to 118,000 psi whereas the tensile strength of the magnetic material alone was approximately 152,000 psi. Thus, the composite rotor construction had a tensile strength equal to 75 percent of the tensile strength of the magnetic bar material so that the mechanical strength of the composite rotor is not too far different from the mechanical strength of a rotor made of a single material.

Thereafter, the stresses in a rotating disc of uniform thickness rotating at 93,500 rpm were calculated for a 2.8 inch diameter rotor with the assumption that the material density was essentially the same throughout (a fair assumption based on the matching of the densities of the materials with the material density being 0.284). The stresses were calculated both for a speed of 93,500 rpm and for an overspeed of approximately 25 percent, i.e. at 117,000 rpm. The stresses were calculated at various distances from the center of the disc (where the maximum stress occurs) to the outer surface or the maximum diameter. The tabulation set forth below provides the maximum combined stresses at the various radii or for 93,500 rpm and 117,000 rpm:

TABLE II

| Radius — in. | Stress in psi 93,500 rpm | Stress in psi at 117,000 rpm |
|---|---|---|
| 0 | 57,028 | 89,400 |
| 0.14 | 56,695 | 88,700 |
| 0.28 | 56,021 | 87,500 |
| 0.42 | 55,715 | 84,000 |
| 0.56 | 51,773 | 80,400 |
| 0.70 | 48,319 | 75,000 |
| 0.84 | 45,166 | 70,000 |
| 0.98 | 40,940 | 63,500 |
| 1.12 | 36,014 | 56,000 |
| 1.26 | 30,431 | 47,000 |
| 1.40 | 24,193 | 37,500 |

It may be seen that the maximum stress that the rotor undergoes at the maximum overspeed of 117,000 rpm is 89,400 psi well within the tensile strength of the composite rotors. Thus, it can be seen that the rotor constructed in the manner described and shown in the instant application has the desired high mechanical strength to withstand the stresses imposed thereon at the desired operating speed as well as overspeeds of up to 25 percent.

In order to determine what the windage losses would be for a similar machine operating at 93,000 rpm and above, certain tests were carried out to determine what the windage losses would be and what the relative percentage losses due to windage were at the operating speeds. Thus, a homopolar generator was constructed having a rotor diameter of 2.738 inches with a 0.07 in. air gap. The generator was driven through a gear box at 93,500 rpm with the driving speed at the input of the gearbox being 10,000 rpm. The rotor was then removed from the shaft and a 1-inch diameter shaft substituted. With no excitation on the field coil, the one-inch shaft was driven at 93,500 rpm and the torque in in. -lbs. on the input shaft to the gearbox measured by a torque meter at various gearbox oil temperatures. The torque measured under these conditions then represents the gearbox losses through friction, bearing losses and windage losses for the 1-inch diameter shaft. Knowing the input speed to the gearbox as 10,000 rpm, a conversion factor from torque to inch-pounds to horsepower and then to watts may be derived from the formula horsepower = $T \times N/63,000$ where T = torque in inch-lbs.
and the formula
$N$ = speed in rpm
horsepower = 746 watts per horsepower Thus, for a 10,000 rpm input, calculation shows that the conversion factor from inch-pounds to watts is equal to 118.4 per inch pound of torque. The watts losses for the gearbox, bearing and windage for the 1-inch shaft was then calculated for various temperatures and the results are shown in the tabulation below:

TABLE III

| Losses in Watts | Temp. °C. |
|---|---|
| 1790 | 28.0 |
| 1780 | 28.5 |
| 1770 | 29.00 |

Thereafter, the rotor was substituted and driven at 93,500 rpm through the gearbox and the torque on the input shaft to the gearbox measured. The rotor was again driven with no excitation on the field winding in order that iron losses or other losses, etc. not enter into the measurement. The torque in inch-pounds was then measured and converted into watts losses. The resultant losses are shown in the tabulation below:

TABLE IV

| Temp. | Torque lb.-in. | Watts loss (T × 118.4) |
|---|---|---|
| 28.0 | 28.7 | 3398 |
| 28.5 | 28.7 | 3398 |
| 29.0 | 28.5 | 3374 |

The losses in watts for the 1-inch diameter shaft were then subtracted from the losses with the 2.738 in. rotor in place to obtain the windage losses due to the rotor. That is, the losses with the 1-inch diameter shaft represent essentially the gearbox and bearing losses so that subtracting this value from the losses set forth in Table IV establishes the windage losses for the 2.738 in. diameter rotor. There is a certain amount of error in this resultant value since the 1-inch diameter shaft obviously has windage losses also. However, since windage is a fourth power function of the diameter of the rotating item, ($W_L \propto D^4$) it can be seen that with a 2.74 inch diameter as opposed to a 1-inch diameter, the windage losses of the 1-inch diameter shaft are approximately 1-56th of the windage losses of the 2.74 inch diameter rotor [i.e., $\propto (2.74)^4$]. Hence, the value for windage losses which result from this procedure at the worst, in error by only a 1 ½ percent.

It can be seen therefore, that a 2.74 inch diameter rotor driven at a speed of 93,500 rpm has a windage loss of approximately 1600 watts. This same machine when energized and driven at this speed produced an output at its terminal approximately 18 KVA at 0.69 power factor, or in other words, approximately 12 ½ KW output. The windage losses at 93,500 were thus only 13 percent which is considered excellent performance and efficiency at 90,000 rpm or above.

It can be seen, therefore, that the high speed homopolar generator embodying the instant invention with its cylindrical straight rotor and offset stator winding construction is capable of being driven at very high speeds, in the range of 90,000 to 120,000 rpm, while withstanding the mechanical stress to which the rotor is subjected at these speeds. Furthermore, with this construction, and the smooth cylindrical rotor configuration, the windage losses are minimized and maintained at very excellent values for these speed ranges. Furthermore, the construction of the rotor is greatly simplified by virtue of this approach, the magnetic cross-section, and geometry of the rotor is optimized to provide the maximum flux for a given geometry and rotor diameter, which in turn, increases the efficiency of the device by minimizing the rotor diameter and the windage losses. Furthermore, the fabrication of the rotor and the generator is simplified, while at the same time, permitting a substantial output in the order of 10 KW or more with an extremely small and relatively light-weight device.

Although a particular embodiment of this invention has been shown, it will, of course, be understood that the invention is not limited thereto since many modifications both as to the arrangements and the components utilized therein may be made. It is contemplated by the appended claims to cover any such modifications which fall within the true spirit and scope of this invention.

What I claim is new and desire to secure by Letters Patent of the United States is:

1. A high-speed homopolar generator comprising,
    a. A housing,
    b. A pair of stators mounted in said housing and having means to receive a plurality of alternating current windings,
    c. A high speed, smooth surfaced, composite, cylindrical rotor adapted to rotate in the stator bore including,
        1. magnetic material extending the length of the rotor and traversed by a magnetic field to produce axially in-line north and south magnetic poles at opposite ends of the rotor axis,
        2. A mass of non-magnetic material bonded to the magnetic material along the length thereof comprising a plurality of layers of magnetic materials the width of said layers decreasing in the outward direction from said bar,
    d. A stator field winding for generating a magnetic field traversing said housing, the stators, and the rotor to produce magnetic poles in said rotor,
    e. Alternating current winding means wound in each of said pair of stators, the conductors of said windings being offset in passing from one stator to the other to produce a displacement of 180 electrical degrees between the windings disposed in the individual stators so that the rotor magnetic poles induce an alternating current voltage in said windings.

2. The high speed homopolar generator according to claim 1 wherein said field winding comprises an annular coil positioned between said stators.

3. The high speed homopolar generator according to claim 1 wherein said rotor comprises a bar of magnetic material extending the length of the rotor and said non-magnetic material comprises a plurality of plasma-arc welded layers of non-magnetic material of decreasing width to form a smooth, composite, cylindrical rotor.

4. The high speed homopolar generator according to claim 3 wherein the bar of magnetic material in said rotor has substantially constant cross-section.

5. A composite, cylindrical, solid rotor for a homopolar machine comprising,
    a. A shaft
    b. An elongated member of magnetic material mounted on said shaft and extending the entire length of the rotor to provide axially in-line magnet rotor poles,
    c. Non magnetic material bonded to opposite faces of the elongated magnetic member to form therewith the composite cylindrical rotor, said magnetic material comprising a plurality of individually bonded layers of non-magnetic material of varying widths.

6. The composite rotor for a homopolar machine as defined in claim 5 wherein said elongated member comprises a straight bar of magnetic material of substantially constant cross-section and a plurality of plasma-arc welded layers of the non-magnetic material of varying widths constitute the mass of non-magnetic material bonded to the bar.

What I claim is new and desire to secure by Letters Patent of the United States is:

* * * * *

UNITED STATES PATENT OFFICE
CERTIFICATE OF CORRECTION

Patent No. 3,737,696  Dated June 5, 1973

Inventor(s) Dr. Eike Richter and George E. Brissey

It is certified that error appears in the above-identified patent and that said Letters Patent are hereby corrected as shown below:

Change the Assignee from General Electric Company, Wilmington, Delaware, to General Electric Company, Wilmington, Massachusetts.

Signed and sealed this 12th day of March 1974.

(SEAL)
Attest:

EDWARD M. FLETCHER, JR.　　　　　C. MARSHALL DANN
Attesting Officer　　　　　　　　Commissioner of Patents